United States Patent
Cumbers

(10) Patent No.: US 6,234,900 B1
(45) Date of Patent: *May 22, 2001

(54) PLAYER TRACKING AND IDENTIFICATION SYSTEM

(76) Inventor: Blake Cumbers, 2421 Ping Dr., Henderson, NV (US) 89014

(*) Notice: Subject to any disclaimer, the term of this patent is extended or adjusted under 35 U.S.C. 154(b) by 0 days.

This patent is subject to a terminal disclaimer.

(21) Appl. No.: 09/588,791

(22) Filed: Jun. 6, 2000

Related U.S. Application Data

(63) Continuation-in-part of application No. 08/916,270, filed on Aug. 22, 1997, now Pat. No. 6,142,876.

(51) Int. Cl.$^7$ .................................................. A63F 9/24
(52) U.S. Cl. ............................... 463/29; 463/16; 463/42; 235/380
(58) Field of Search .................................. 463/1, 11, 12, 463/13, 16, 17, 18, 19, 20, 25, 29, 30, 40, 41, 42, 46, 47; 700/90, 97, 92; 273/138.1, 138.2, 139, 143 R, 292, 293; 235/375, 380, 382; 382/100, 115, 118

(56) References Cited

U.S. PATENT DOCUMENTS

| | | |
|---|---|---|
| 4,821,118 | 4/1989 | Lafreniere . |
| 5,012,522 | 4/1991 | Lambert . |
| 5,179,517 | 1/1993 | Sarbin et al. . |
| 5,258,837 | 11/1993 | Gormley . |
| 5,283,644 | 2/1994 | Maeno . |
| 5,386,103 | 1/1995 | DeBan et al. . |
| 5,432,864 | 7/1995 | Lu et al. . |
| 5,530,438 | 6/1996 | Bickham et al. . |
| 5,594,806 | 1/1997 | Colbert . |
| 5,613,912 | 3/1997 | Slater . |
| 5,941,774 | 8/1999 | Takemoto et al. . |
| 5,984,780 | 11/1999 | Takemoto et al. . |

OTHER PUBLICATIONS

True Face Access System 9–page brochure by MIROS, INC., circa unknown

*Primary Examiner*—Michael O'Neill
(74) *Attorney, Agent, or Firm*—Quirk & Tratos

(57) ABSTRACT

A system and method is set forth for tracking the play of players playing gaming devices such as slot machines through passive identification of the players. Passive identification can be achieved by analysis of a player, such as facial image photography, infrared scan, scans of a player's iris or other features of the eye, and the like. Players provide identification information and physical recognition data is acquired as by a digital or video camera. For each player an account file and a file of the image data is stored. When the player plays the slot machine, a camera scans the player and acquires image data which is compared to stored data to identify the player. The identified player's account file is opened and data from the device representing parameters of play, e.g. amounts wagered, is allocated to the identified player's account file for the purpose of providing comps and other benefits to the player. Doe image data and account files can be stored to allocate parameters for unidentified players. Further the device acquired image data can be compared with stored image data to identify undesirables such as slot cheats or the like.

13 Claims, 3 Drawing Sheets

PLAYER TRACKING AND IDENTIFICATION SYSTEM

CROSS REFERENCE TO RELATED APPLICATION

This application is a continuation-in-part application of commonly owned application Ser. No. 08/916,270 filed Aug. 22, 1997 and titled "Player Tracking and Identification System", now U.S. Pat. No. 6,142,876.

FIELD OF THE INVENTION

The present invention relates to systems and methods for identifying and tracking the play of players playing gaming devices such as slot machines.

BACKGROUND OF THE INVENTION

It has been known in the past for casinos to track the play of gamblers for the purposes of determining a basis for rewarding players with compensation, referred to in the industry as "comps." These comps to high stake players may be in the form of cash gifts, meals, free rooms or the like. Providing these comp rewards a player for playing at the casino, maintains the gambler's loyalty to the casino and is used to promote the casino.

In the past, the casinos typically only tracked players playing high stakes table games such as Baccarat and Blackjack. The casino would estimate the average wager per hand of the player, estimate the number of the hands or decisions per unit time, e.g. per hour and, knowing the amount of time spent by the gambler, could reasonably approximate the amount wagered by the player during a gaming session. Based upon this amount, they would provide the gambler with suitable comps to reward him/her for that level of play.

Recently casinos have begun to track players play of gaming machines such as slot machines, video keno, video poker and the like for purposes of rewarding players with comps and for promotional purposes. To track players of these machines, casinos have installed computer-based player tracking systems. While the specifics of these systems may vary, their operating principles are generally the same.

Players who wish to be tracked, voluntarily enter the system through a sign-up procedure. The player gives their name and address or the like to identify the player and the player is issued a player's card having a machine readable element. The player's identity and card number are entered into the computer and a file is opened for the player. At each machine there is disposed a card reader for reading the player's card. These card readers of the machines communicate with the tracking computer. Additionally, each machine is adapted to issue data to the processor indicative of the player's play, e.g. the amount of each wager.

Thus, a player to be tracked inserts their card into the card reader for the machine they are going to play. The reader issues data to the processor which finds the player's file and places it an open condition. As the player plays the machine, the machine issues data to accumulate the total amount wagered by the player or some portion or ratio thereof during play, the accumulated value assigned or allocated to the player account file as what is commonly known as player "points." When the player reaches certain levels of points in their file, they become eligible for certain comps.

The above procedure has been used for table games as well. The player playing a table game hands their identification card to a dealer or manager who swipes the card through a card reader or manually enters the player's card number to place the player's file in an open condition. During play, typically the floor manager or pit boss, estimates the average amount wagered per hand for the player. When the player desires to leave, the manager through a data input device inputs the average amount wagered per hand and swipes the player's card through the card reader or manually closes the file which notes the elapsed time of play and based upon that elapsed time and the average wager assigns comp points to the player's account file.

There are several drawbacks to the tracking system described above. One drawback is that the system requires the player to have their identification card available for reading by a card reader. The player may forget their card and hence they are awarded no points during play. Further, the player may simply forget to insert the card into the card reader, again losing the ability to accumulate points toward comps. Still further, the system can be subject to abuse. A single identification card can be passed around to different players to build up points for the individual player's account. There is no means to confirm whether or not the card being presented is actually the card of the person to whom it was issued. Still further, there is no means to allocate points to unidentified players who later decide that they want to be tracked. Unless the tracking system can read a card, no points are accrued for that player.

In a heretofore unrelated field, certain technologies have been developed directed to passive identification of persons. For example, in Maeno U.S. Pat. No. 5,283,644 issued Feb. 1, 1994, the disclosure of which is hereby incorporated by reference, a crime prevention monitor system is set forth which has a stored image data base of the facial images of persons authorized to have access to a particular area. When a person is sensed in this secure area, a camera obtains an image and compares that image to the stored data to confirm if the person is one of the authorized persons. If not, a signal is sent to authorities.

In U.S. Pat. No. 5,012,522 issued Apr. 30, 1991 to Lambert, the disclosure of which is hereby incorporated by reference, an autonomous face recognition system is set forth which is adapted to locate and recognize human faces from a video scene. The acquired facial image is broken into separate windows and recognition is based upon a specific algorithm.

In U.S. Pat. No. 5,432,864 issued Jul. 11, 1995 to Lu et al., the disclosure of which is hereby incorporated by reference, an identification card system is disclosed where data representative of a person's facial image is stored on a magnetic strip on a card for verification of the identity of the person carrying the card.

Another facial feature which can provide positive identification of a person is the iris pattern of the eye. An example of such a system is disclosed in Matsushita, U.S. Pat. No. 5,901,238. Iris-pattern identification systems are commercially available from Sensor, Inc.

It would be highly desirable if a system and method could be devised which had the objects by which a player could be passively identified by certain inalterable facial features for purposes of providing data for player tracking, for allocation of previously acquired points to new players which were previously identified and to assist in spotting undesirables such as slot cheats.

SUMMARY OF THE INVENTION

There is, therefore, set forth according to the present invention a method and system to obtain the objects set forth above and others by providing a player tracking system which includes passive player identification, which can allocate previously accumulated data to a newly identified player and which can assist in spotting suspicious individuals or suspected cheats and which overcomes the problems and drawbacks set forth above.

Toward this end, a method is set forth for tracking selected parameters of play of a player playing a wagering game which includes inputting and storing reference informational data from a player including player identification data and matching physical image identification data into a data processor memory to form a library of files of identified players and their corresponding image identification data. The image identification data may be any passive positive identification means, the facial image of the player, image data corresponding to the iris, retina or cornea aspects of the player, an infrared profile of the player or any other distinguishing, physical aspect of the player which can be passively obtained by sensors, cameras or the like. When a player plays a game, such as a slot machine, the player is scanned at the machine by a suitable sensor such as a digital or video camera to acquire an image of the player corresponding to the image data stored. That image is transmitted to the processor which compares the data to the stored data corresponding to the stored images to determine if the acquired image corresponds to a stored identification image data to identify the player. If the received acquired image corresponds to the stored identification image data of a player of the library, the processor opens the identified player's file to receive and store data relating to the parameter of play. If the received image does not correspond to the stored identification image data of a player of the library, the processor creates a doe memory file and stores in that memory file the acquired image data as well as opening a corresponding doe file to receive game parameter data. The method further includes sending at least one parameter of play, e.g. the amount wagered, to the processor, the processor storing the game parameter data in the corresponding player's file.

The system for tracking a parameter of play of a player includes a processor having a first data storage device, the data storage device including for each player to be tracked personal reference data and image data corresponding to a passively acquired, physically distinguishing aspect of the player, e.g. facial image, retina or cornea patterns, infrared profile. An image acquirer is provided such as a digital or video camera at the game being played to acquire an image of the player playing the game corresponding to the stored data. Means are provided for inputting a parameter signal representative of the parameter of play to be tracked by the system such as data transmitted from the machine being played by the player to the processor indicative of the amount wagered by the player. The processor includes means for comparing the acquired image to the stored library of images of the first data storage device to determine whether the acquired image matches a stored image to identify the player. If a match is found, the processor assigns the parameter of play data to the identified player's file.

The method and system according to the present invention therefore permits for passive identification of the player. The player need not present an identification card to be tracked. To sign up for the tracking system, a player merely need only provide identification data, such as name and address as well as permit the acquisition of a digital facial image, retina scan, corneal scan, infrared scan or the like of the player such as by sitting in front of a digital or video camera or other similar identification apparatus. The data and image are thereafter stored in the tracking system processor for future comparison and allocation of points. At each machine the image acquirer can acquire the image of the player and transmit it to the processor to identify the player and allocate parameters of play to the player's file without the use of any identification card.

Furthermore, a player which had not previously signed up to be tracked, can have previously acquired points assigned to their file. When their file is opened, any points which may have been assigned to this player under a doe file are transferred to the player's file whereby the player does not forfeit any points which they may have acquired prior to signing up for the system.

Still further, if an image library of known cheats or undesirables is also provided, the acquired images can be compared to identify such persons playing the games at the casino.

BRIEF DESCRIPTION OF THE DRAWINGS

These and other features and advantages, will become better appreciated as the same becomes better understood with reference to the claims, specification and drawings wherein:

DESCRIPTION

Figure 1:
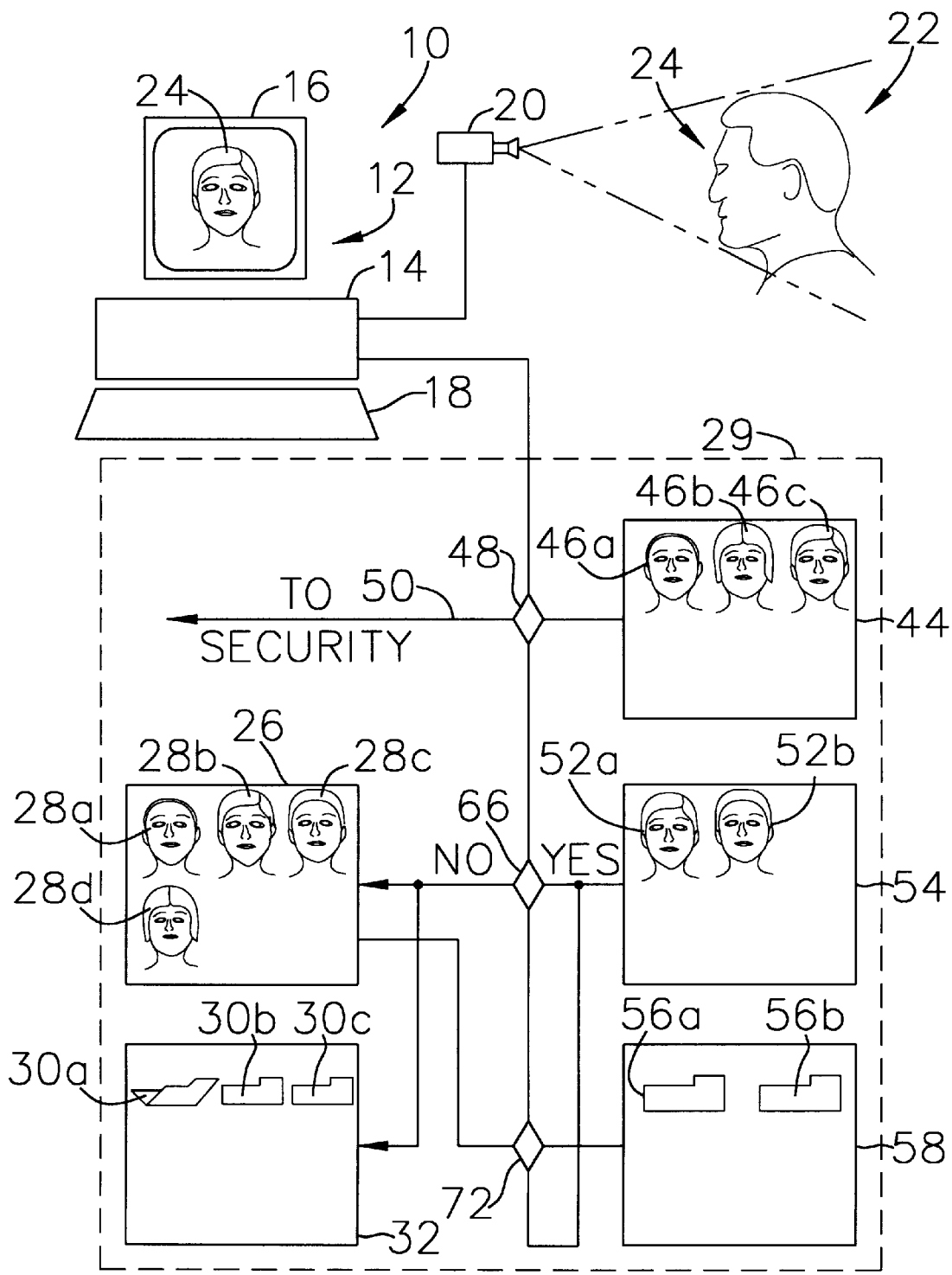
FIG. 1 is an illustration of the system and method of the present invention for persons to be signed up to the system.

Turning to the drawings, FIG. 1 illustrates the system and method according to the present invention for initially acquiring the digitized facial images of players for tracking play of the players while playing a gaming device or table game for the purposes of determining awards, promotions or comps to be given to the player based upon play. While the description as hereinafter set forth is directed to the player playing an electronic gaming device such as a slot machine, it is to be understood that it could be used as well with table games as long as the player is positioned such that a digitized image of the player's face can be acquired according to the present invention.

The system 10 includes a data entry station 12 including a processor 14 having therewith a display monitor 16 and data entry means such as a keyboard 18. The processor 14 may be any suitable personal computer and it should be understood that multiple stations 12 could be used to input and manipulate data according to the method and system of the present invention.

The system 10 includes means for acquiring a digitized image of one or more physically distinguishing features of a person. While the description as hereinafter set forth is directed to using the appearance of the persons' face as the distinguishing parameter, it should be understood that the persons retina or corneal profile could also be adopted as the physical feature as well as infrared profiles or the like. Sensor, Inc.'s IriScan identification system, which identifies a human being through the structural pattern of the iris is an example of an acceptable commercially available system. Further the system and method of the present invention could be based upon the consideration of several physical features, e.g. facial image and retina profile, to identify players. Thus it should be understood that the system merely requires the ability to passively acquire a physically distinguishable feature of a player. The term "passive" as used herein means that identification can take place without the individual taking a positive physical action to intentionally cause identification to occur, such as swiping a card in a card reader or placing a finger on a fingerprint reader. No invention is claimed in any specific technology for a passive identification method.

While any passive identification technique may be used in accordance with the invention, the invention will be described using full facial identification technology.

To acquire image data of the facial image of the player a digital camera 20 or a video camera may be used whose video image is processed to define a digitized image. While the camera 20 scans the person's face in the visible wavelengths of the electromagnetic spectra, other wavelengths could be used such as infrared or the like to obtain an identifiable image of the player. As illustrated in FIG. 1, a person 22 who wishes to have their play of games tracked poses and the image of their face 24 is acquired by the camera 20, processed and stored in a suitable data structure for purposes which will hereinafter become evident. The acquired image is displayed at the monitor display 16 and the attendant assures that a clear and correct image is obtained. The processor 14 processes the digital image of the person's face to obtain a gestalt facial image in the manner as suggested by Lambert U.S. Pat. No. 5,012,522 or to isolate or highlight data corresponding to unalterable features of the face 24 such as spacings between eye pupils, mouth shape, configuration of the eyes, nose and mouth. Preferably the processor 14 processes the digital image to form facial identification data representing substantially unalterable and unconcealable features of an individual's face whereby changes in hair color or style, growth of beards or a mustache or wearing glasses will not preclude identification of the individual. This data as shown in FIG. 1 is stored for each individual in a facial identification data (FID) library 26 of facial identification data entries illustrated as 28a–d maintained at a player tracking or host processor 29. It is to be understood that while only four facial identification data entries 28a–d are shown, that the FID library 26 would have any number of data entries depending upon the number of persons who wish to be entered into the system.

At the station 12, data is also input by using the keyboard 18 to identify the player by, for example, name and address of the player and signals are issued to open a player account file, for example, account file 30a at the host processor 29 which is stored in a suitable data structure hereinafter referred to as player account library 32. Each of the account files 30a–d corresponds to a facial identification data entry 28a–d.

With the FID library 26 and a player account file library 32 thus created in the host processor 29 data structure, the system 10 and method according to the present invention can be operated.

Figure 2:
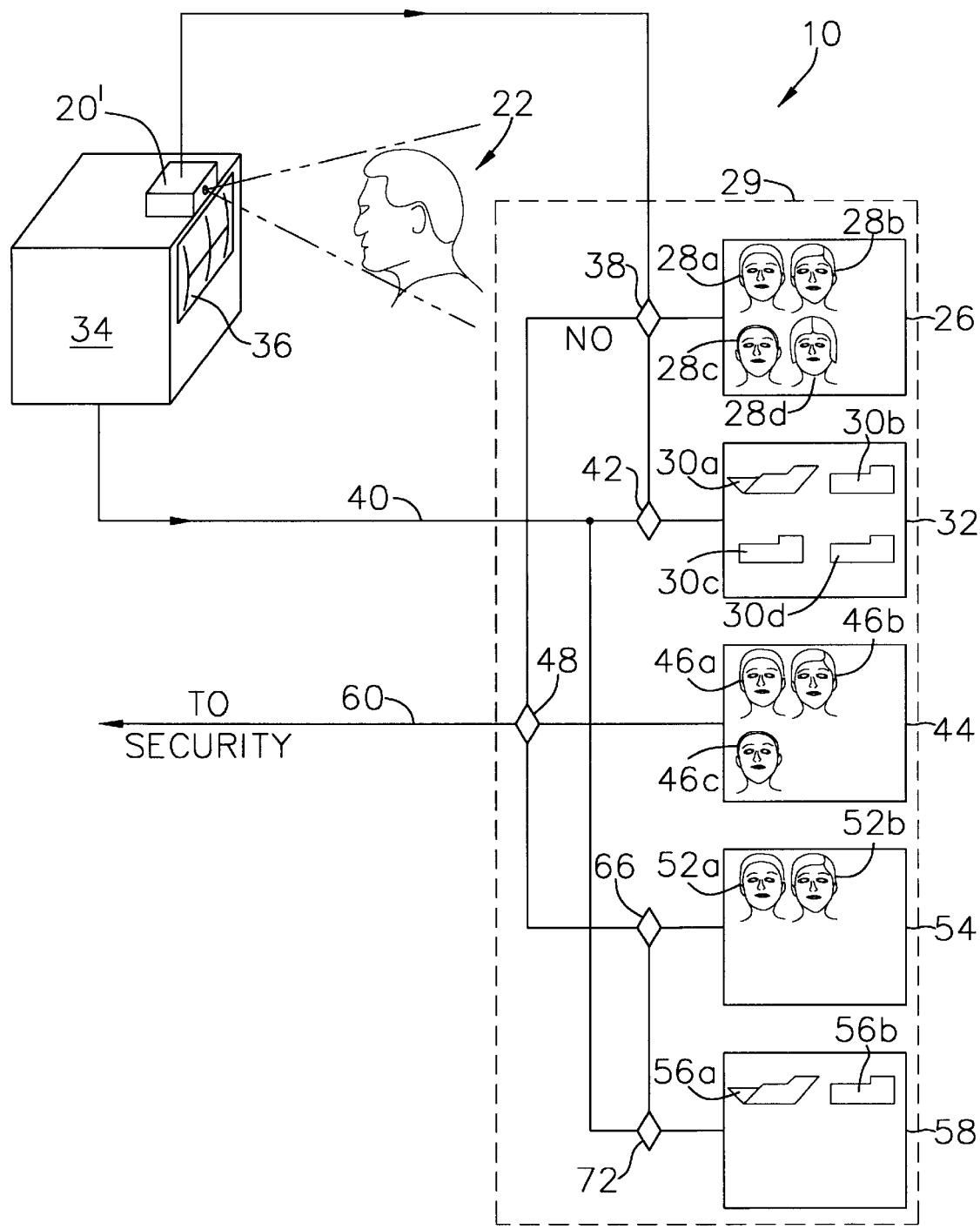
FIG. 2 is an illustration of one embodiment of the present invention for passive identification and tracking of player's play at a gaming device.

Turning to FIG. 2, to track a person's play at a gaming device 34 shown as a slot machine, the person 22 sits in front of the device 34 in the manner suggested. A digital or video camera 20' is provided on or proximate to the gaming device 34 and is directed to acquire an image of the face of the person playing the device 34. Accordingly, the camera 20' may be mounted on the device 34 or may be incorporated therewith. As can be appreciated, since the device 34 has a game monitor 36, the person's face in playing the gaming device 34 will be in a range of positions in relation thereto suitable for acquisition of the player's facial image.

The digital or video camera 20' acquires an image of the person's face and sends that signal to the host processor 29. The acquired image may be digitized or processed, as suggested in Lambert U.S. Pat. No. 5,012,522 to isolate the person's face from any background images. The host processor 29 at 38 compares the acquired digital image of the person's face to the facial identification data entries 28a–d stored in the FID library 26. As suggested in FIG. 2, if the acquired image substantially corresponds to a stored image entry, the identified player's account file, shown as account file 30a, is placed into an open condition to receive the parameter of play from the gaming device 34 being played by the player. A signal 40 is transmitted from the device 34 indicative of the desired parameter of play. As illustrated in FIG. 2, this desired parameter of play may be the wagers made by the player at the device 34. In a known manner, each time the player makes a wager at the device 34, a data signal is generated indicative of the amount of the wager. Thus, as a player inputs coins or tokens into the device 34 to play, signals 40 are issued to the host processor 29. The host processor 29 at 42 allocates the parameter of play, e.g. wagers or portions thereof or points related to the amounts wagered (hereinafter referred to as points), to the opened data file 30a which has been opened for the identified player. In this fashion, data corresponding to the player's accrued points can be assigned to the identified players account file 30a.

As further can be appreciated, since the acquisition of the facial image data and comparison at 38 is adapted to compare data which is substantially unalterable, the correct allocation of points to the player's account file 30a–d is maintained. Furthermore, the player need do nothing other than sit at the device 34 and play. The system 10 and method according to the present invention passively acquires the user's facial image and in response to recognition of the player opens up the corresponding account file 30a–d to allocate points.

With continuing reference to FIGS. 1 and 2, the host processor 29 may also include a security file library 44 of stored facial identification data images 46a–c for persons such as known slot cheats or other undesirables. This data may be stored, as referred to above, in the host processor 29 data structure or may be acquired and accessed from an outside vendor such as a security service.

With reference to FIG. 1, when a person desires to be included into the system 10 for tracking of play, the system 10 at 48 compares the acquired facial identification data to the data stored in the security file library 44 to determine if the acquired image of the person corresponds to any of the facial identification data entry 46a–c stored in the security file library 44. If there is no correspondence, the facial identification data is stored in the manner described above and a corresponding account file is opened at the data structure. If there is a correspondence, a signal at 50 is sent to security who may then handle the situation by confirming whether or not the individual is an undesirable or slot cheat. If the person is not, the operator of the system 10 at the station 12 and more particularly by keyboard 18 can override the security signal to store the acquired facial identification data and open the account file.

Further with reference to FIG. 2, when a person plays a gaming device 34, if the person's acquired facial identification data does not correspond to facial identification data stored in FID library 26, the acquired facial identification data is assigned a doe file entry 52a–b in a doe library 54 and the acquired facial identification data is stored in the manner described above with reference to the FID library 26. As can be appreciated, the doe library 54 of facial identification data, while shown as only including two doe data file entries 52a–b, can have any number. Furthermore, a corresponding doe account file 56a–b is opened in a doe account library 58 which receives the parameter data and stores the same in the manner described above. Hence, even though the person has not heretofore been identified as by agreeing to enter into the system to have their play tracked, a doe facial identification data file entry, for example entry 52a, for the person and a corresponding doe account file 56a are opened for the player. As this new "doe" player plays, the accrued points are allocated to the corresponding account file.

Hence forward, each time this "doe" player plays the gaming device 34 which is incorporated into the system 10, the system 10 first compares the acquired facial image data to the facial identification data stored at FID library 26 and if no corresponding facial images obtained, compares to the facial identification data contained in the doe library 54. If a corresponding facial image doe file entry 52a–b is retrieved, the corresponding doe account file 56a–b is opened and the accrued points during play of the gaming device 34 is allocated to that file. Again, if the player is neither identified at the FID library 26 or at the doe facial identification library 54, the acquired facial image data is assigned a new doe facial identification data entry and corresponding doe account file. Thus, over time, a library of images can be obtained so that points can be allocated. Furthermore, when a "doe" player is detected, their corresponding account file can be interrogated and if deemed appropriate the person can be approached by personnel to determine if they would like to have personal identification data entered into the system 10 so that their accrued points can be allocated to a known individual.

With reference to FIG. 2, it is also shown that the system 10 can be used to determine whether or not the person playing the gaming device is potentially an undesirable or slot cheat. As shown, the acquired facial identification data as acquired by digital camera 20', if it does not correspond to facial identification data entered into the FID library 26, is tested against FID data stored in the security file library 44. If a correspondence occurs, a signal at 60 is sent to security so that they can monitor or otherwise handle the situation. If not, the facial identification data is processed in the manner described above.

Figure 3:
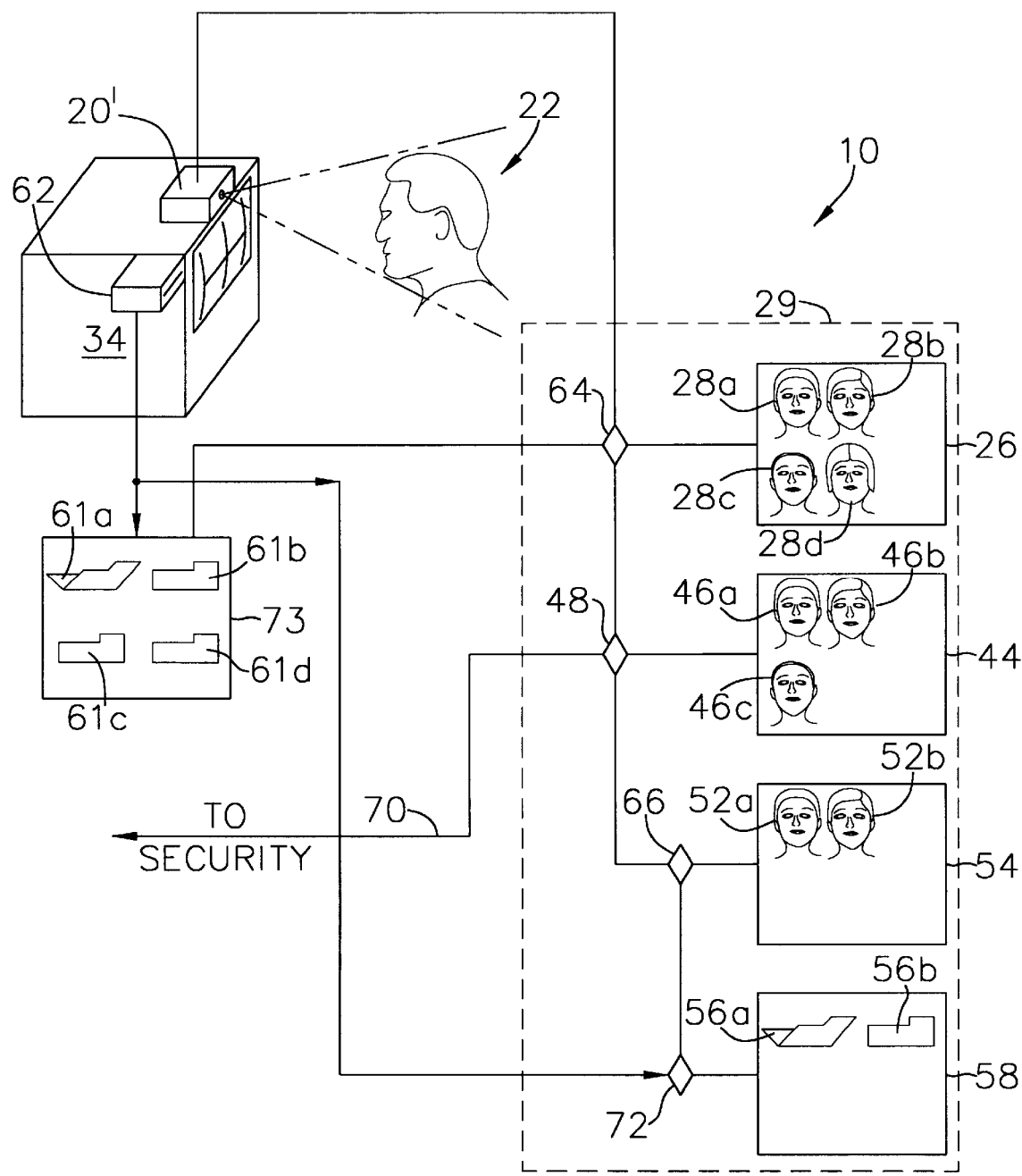
FIG. 3 is an illustration of yet another embodiment of the system and method for passive identification of a player and tracking of a parameter of play of a gaming device.

With reference to FIG. 3, the system 10 and method of the present invention is shown as being used with known player tracking systems. Like components bear the same reference numerals.

As shown, associated with the gaming device 34 is a card reader 62 of known construction by which a player inserts an identification card (not shown) issued in the traditional manner. Hence in the playing of the device 34, the player inserts their card and begins playing the device 34 whereby the insertion of the card opens up the corresponding player's tracking account file 61a–d in a tracking data structure 73, shown as data file 61a, and allocates the points accrued during play of the device 34 thereto. When the player leaves the device 34, and removes their card from the card reader 62, the player's tracking account file 61a is closed.

According to the system and method of the present invention, means are provided to acquire facial image data of the player playing the device 34. Accordingly, a digital or video camera 20' may be provided on the gaming device 34. The acquired image is compared at 64 to the identification data entries 28a–d of the FID library 26 to determine whether or not the acquired facial identification data corresponds to stored facial identification data. If a concordance occurs, the host processor 29 confirms that this is the person who was issued the identification card and if so, opens the corresponding account file 61a. If not, as described above, the acquired image is compared at 48 against the library of images maintained in the security file library 44 to see if the person is a known undesirable or slot cheat. If so, a signal 70 is sent to security to address the situation. If not, the signal is compared at 66 with any previously acquired doe images and if so open up the corresponding doe account file in the manner described above. If no corresponding doe file is acquired, the facial identification image data is assigned at 66 and stored in a corresponding new doe account file which is opened and the points are allocated thereto.

As can be appreciated, the system and method according to the present invention enables players to have points accrued during gaming of the device 34 or for that matter a table game where facial images can be acquired, to the corresponding account data file whether or not the person has identification card or not. Furthermore, the system provides a means to allocate acquired points to persons heretofore not identified by the system in dummy or doe files. With reference to the data representing the points accrued to a doe account 56a–b, should the person desire to join in the system 10, when they do so, with reference to FIG. 1, the system 10 compares the acquired image at 66 with doe image data entries 52a–b and if a corresponding image is found, the accrued points are transferred at 72 to a now, player identified, account file 61a.

While I have shown and described certain embodiments of the present invention, it is to be understood that it is subject to many modifications and changes without departing from the spirit and scope of the claims presented herein.

I claim:

1. A method for tracking selected parameters of play of a player playing a wagering game comprising:

inputting and storing reference informational data from each player including player identification data and matching physical identification image data into memory of a data processor to form a library of files of identified players and their corresponding physical identification image data;

during play of the game scanning the player thereof to acquire image data of the player;

transmitting said acquired image data to said data processor;

providing data to the data processor identifying the game played by the player;

said data processor matching the received image data to the data identifying the game being played by the player;

said data processor comparing said received acquired image data to said identification data of said library to determine if acquired image data corresponds to said stored identification data to identify the player;

if said received acquired image data corresponds to the identification data of a player of said library, said data processor storing in the memory of the player's file the game identification data and the corresponding player identification to match the identified player to an identified game;

if the acquired image data does not correspond to the identification data of a player of said library, said data processor creating a doe memory file and storing in the doe memory file the acquired image data and game identification data; and sending at least one parameter of play of the identified game to said data processor, said data processor matching the parameter to the player's file to store parameter of play data allocated to the player playing the game.

2. The method of claim 1 wherein the game is a slot machine wherein the player plays the game by inputting a wager into the machine, the method including sensing each wager made by the player during play of the machine and generating signals corresponding thereto, sending the wager corresponding signals to said data processor, said data processor matching the wagering signals to the player's file to track the wagering by the player at the machine.

3. The method of claim 1 the game is a slot machine wherein the player plays the game by inputting a wager into the machine, the method including locating a camera on the machine at a position to scan the player playing the machine to acquire the image data of the player.

4. The method of claim 1 further including giving the player an instrument including machine readable player identifying data, storing in the memory of the data processor files data corresponding to each player assigned an instrument, locating the instrument at an instrument reader at the game played by the player, said reader sending data signals to the data processor corresponding to the readable identifying data, said data processor comparing the data signals sent which correspond to the readable identifying data and image data to identify the player and his data file and confirm allocation of parameter data to a player's file.

5. The method of claim 1 further including inputting and storing reference informational data from each player including player identification image data and matching the image data into the memory of a data processor to form a library of files of identified players and their corresponding physical identification images, comparing the inputted physical image identification data to any previously acquired image data files assigned a doe identification and if there is a match, said processor allocating all game parameters previously allocated to the corresponding doe file to the corresponding player file.

6. The method of claim 1 including sending wagering data as the parameter of play.

7. The method of claim 1 including sending wagering data per unit time as the parameter of play.

8. The method of claim 1 including storing the physical identification data as data corresponding to the facial image of the player.

9. The method of claim 1 including storing the physical identification data as data corresponding to the characteristics of the player's eyes.

10. The method of claim 1 including storing the physical identification data as data corresponding to an infrared image of the player's face.

11. A system for tracking a parameter representative of the play of a player playing a wagering game comprising:
a processor having a first data storage device, said first data storage device including for each player to be tracked personal reference data and player physical identification data;
an image acquirer adapted to, at the game being played, acquire image data of the player playing the game corresponding to the stored physical identification data;
means for inputting a digital parameter signal representative of the parameter of play to be tracked by the system;
a data link to transmit said acquired image and said parameter signals to the processor; and
said processor including means for comparing the acquired digital image to the stored image data of the first data storage device to determine whether the acquired image matches a stored image to identify the player, if said match is found said processor assigning the parameter of play to the identified player,
whereby tracking of the player wagering activity is enabled without active entry of personal slaver data at the time of play by either player or casino personnel or by a player identification card.

12. In a system for allocating to a player account the wagering activity of said player playing an electronic gaming device of the type having adapted to generate bet data representative of each wager made by the player, a player tracking processor, a memory structure including for each player an account file including personal data to identify the player and historical wagering activity data for the player, means for identifying each machine and communicating the bet data to the tracking processor and means for allocating the bet data to a player's account for recording said historical wagering activity, the improvement comprising:
a player-identifying data processor having for each player a memory structure including (i) digital physical image data of said player and (ii) corresponding player identification data;
an image acquirer at each machine to acquire image data of the player playing the machine corresponding to said stored image data;
a first data link to transmit said acquired image data to said player-identifying data processor;
means for generating a signal identifying the machine which is the source of the acquired image data;
said player-identifying data processor including means for comparing the acquired image data to the image data of the memory structure to determine if the acquired image data corresponds to the stored image data to identify the player;
means for the player-identifying data processor to communicate with the player tracking processor; and
means for, if the player is identified, directing the bet data from the identified machine to the identified player's account file,
whereby tracking of the player wagering activity is enabled without active entry of personal player data at the time of play by either player or casino personnel or by a player identification card.

13. A method for tracking selected parameters of play of a player playing a wagering game wherein tracking of the player wagering activity is enabled without active entry of personal player data at the time of play by either player or casino personnel or by a player identification card comprising:
inputting and storing reference informational data from each player including player identification data and matching physical identification image data into memory of a data processor to form a library of files of identified players and their corresponding physical identification image data;
during play of the game scanning the player thereof to acquire image data of the player;
transmitting said acquired image data to said data processor;
providing data to the data processor identifying the game played by the player;
said data processor matching the received image data to the data identifying the game being played by the player;

said data processor comparing said received acquired image data to said identification data of said library to determine if acquired image data corresponds to said stored identification data to identify the player;

if said received acquired image data corresponds to the identification data of a player of said library, said data processor storing in the memory of the player's file the game identification data and the corresponding player identification to match the identified player to an identified game.

* * * * *